Figure 1:
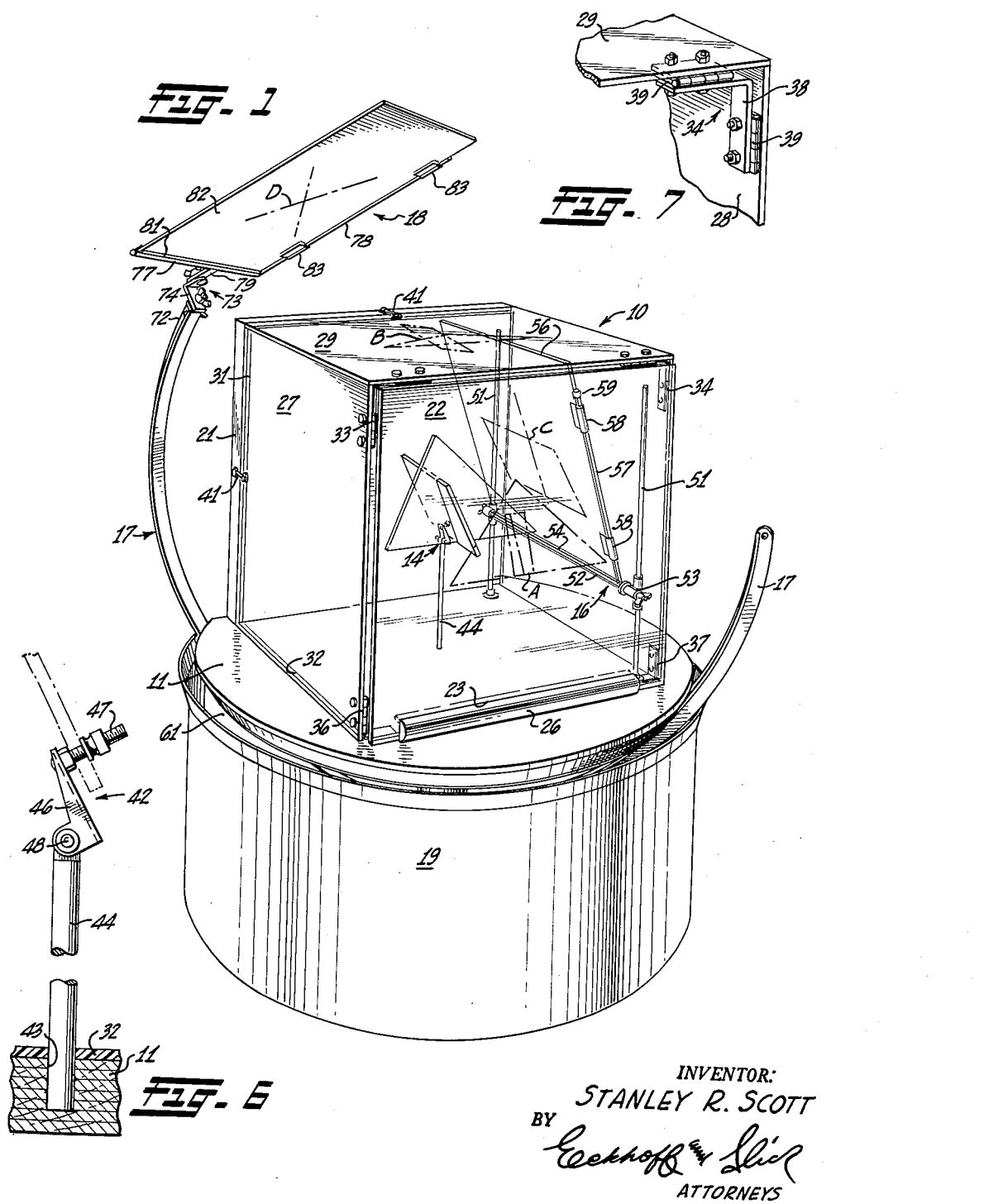

Sept. 25, 1962

S. R. SCOTT 3,055,120

GEOMETRY PROJECTION DEVICE

Filed Aug. 3, 1961

2 Sheets-Sheet 1

INVENTOR:
STANLEY R. SCOTT
BY
Eckhoff & Slick
ATTORNEYS

Sept. 25, 1962 S. R. SCOTT 3,055,120
GEOMETRY PROJECTION DEVICE
Filed Aug. 3, 1961 2 Sheets-Sheet 2

INVENTOR.
STANLEY R. SCOTT
BY
ATTORNEYS

United States Patent Office 3,055,120
Patented Sept. 25, 1962

3,055,120
GEOMETRY PROJECTION DEVICE
Stanley R. Scott, 1411 Olive, Oakdale, Calif.
Filed Aug. 3, 1961, Ser. No. 129,003
4 Claims. (Cl. 35—26)

This invention relates to an apparatus designed as a visual and mechanical aid for use in teaching the basic graphic functions of drafting and descriptive geometry. It is particularly useful in explaining methods of illustrating three-dimensional objects on two-dimensional surfaces.

The use of a simple box-like structure, sometimes hinged, to illustrate orthographic projection has, of course, been known and used for many years. This concept normally employed three planes to permit an explanation of the drawings and views required to define an object, as, for example, the top plan view and two adjacent side views at right angles thereto.

It is an object of this invention to provide a simple, easy-to-use instructional apparatus for clarifying the spatial relationship between solid objects and their graphic representations, utilizing auxiliary planes in addition to the usual three views mentioned above.

It is another object to provide a visual aid device for instructional purposes incorporating an interchangeable three-dimensional model or design having tangible depth adjustably located within a projection box including hinged reference planes and one or more adjustable auxiliary planes.

It is a further object to provide an orthographic projection box in which a source of light and luminescent materials are used in a manner to accentuate specific portions of the model for assistance in visual identification.

More particularly, this invention relates to the provision of a substantially cubic graphic projection box apparatus having hinged top and end planes, a primary auxiliary plane rotatively mounted perpendicular to any two opposite sides of the box, and a secondary auxiliary plane universally mounted on an adjustable and rotatable arcuate supporting member.

A still further object of the invention is to provide a hollow, generally cubic, orthographic projection box and appurtenances for use in the teaching of drafting, descriptive geometry as concerned in the solution of three-dimensional problems, and other engineering problems dealing with the relative spatial location of objects. The apparatus comprises a box assembly incorporating a vertical front plane, hinged top and end planes which may be rotated to a position parallel to and in line with the front plane, a primary auxiliary plane adjustably mounted preferably within the confines of the box; a secondary universally-mounted auxiliary plane supported on an arcuate member adjustably mounted on the axial support of the projection box; and a means for directing ultraviolet light to specific receptive surfaces or portions of the model under study.

In practical use, the front, end, and top planes of the box, as well as the two auxiliary planes, are made of clear plastic or glass, thus permitting the use of a grease or marking pencil to delineate the projected view of the model thereon. The frontal plane is readily removable to permit access to the geometric model and primary auxiliary plane, and the two end planes are hingedly fastened to the top plane through angular connecting brackets to allow removal of the top and end planes as a unit.

Figure 2:
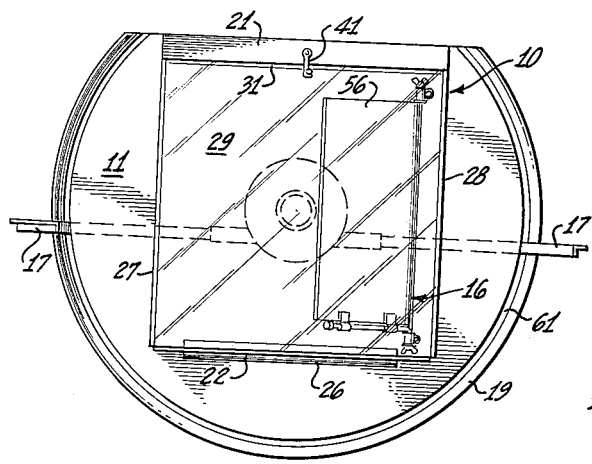
Figure 3:
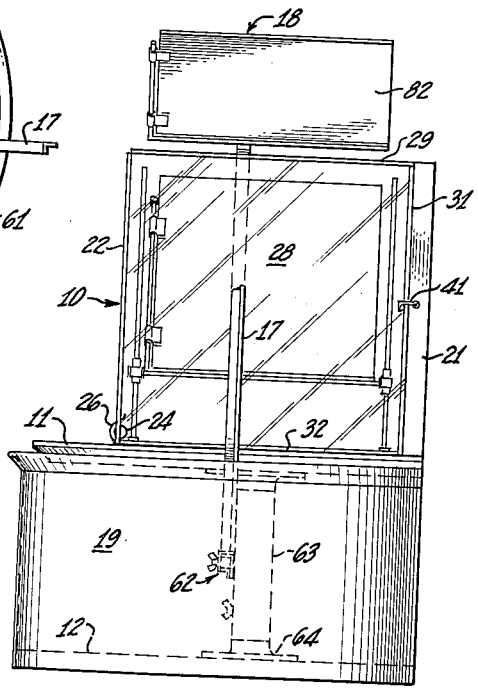
Figure 4:
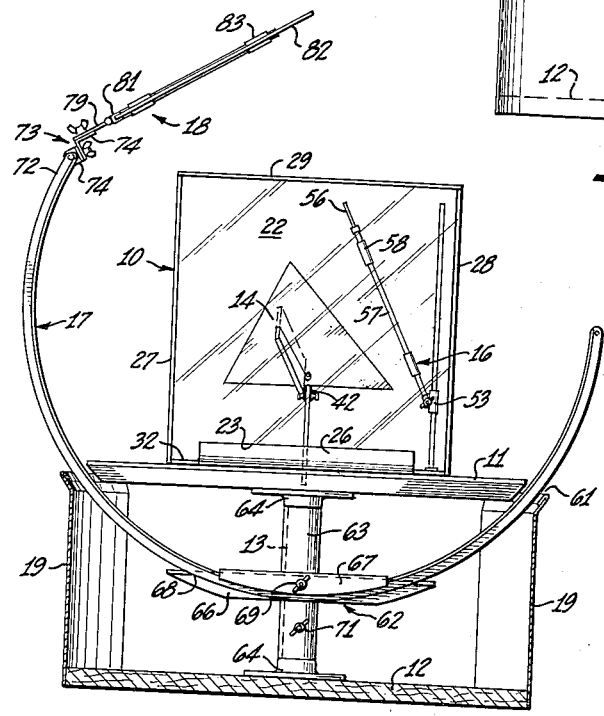
Figure 5:
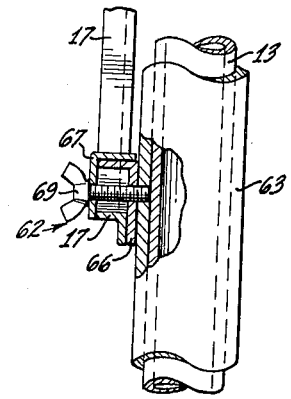

In the drawings:
FIGURE 1 is a perspective view of the appaartus with a model installed therein.
FIGURE 2 is a top plan of the device with the secondary auxiliary plane and model omitted.
FIGURE 3 is a side elevation with model omitted.
FIGURE 4 is a front elevation with the support base and housing in section.
FIGURE 5 is a detail of the fastening means for the secondary auxiliary plane support arm.
FIGURE 6 is a detail, partly in section, of the adjustable support for a model.
FIGURE 7 is a detailed perspective of a hinge connection between top and side planes.

The apparatus of the present invention comprises basically a cubic projection box 10 mounted on a generally circular table 11 supported upon base 12 by post 13. Provision is made in table 11 to mount a geometric model 14 and a frame assembly carrying an auxiliary plane 16. The auxiliary plane 16 is preferably mounted within the structure, although it may be mounted outside of the cubic projection box. An arcuate support element 17 is pivotally mounted about post 13 and provides a rotatable support for an auxiliary plane 18. A vertical sheet metal wall 19 is affixed to the periphery of base 12 to provide an enclosing screen which is open at the rear.

The projection box 10 includes a solid vertical back wall member 21 rigidly affixed to table 11 and a plastic front plane 22 removably supported in a groove in table 11 to permit ready access to geometric model 14 and auxiliary plane 16 for adjustment as required. Front plane 22 has a bottom portion cut out as at 23 to provide for a so-called "black" light tube 24 and its reflector housing 26 mounted on table 11. The plastic side planes 27 and 28 and top plane 29 are hingedly interconnected in a manner to permit their rotation to a position parallel and aligned with front plane 22, to facilitate the understanding of the relationship between a three-dimensional object and a two dimensional graphic surface.

In order to provide the necessary stability in the projection box during handling, and to provide a contrasting background for the model, a thin sheet 31 of black opaque plastic is affixed as with cement to the back wall 21 and a similar sheet 32 is affixed to the table 11 within the limits of the side and front planes. Thus, the edges of sheets 31 and 32 serve as locators for limiting the inward movement of the side and top planes when in the box-forming position.

A pair of opposed angular bracket hinge assemblies 33 and 34 are provided at the top front corners of the projection box to permit rotation of the top plane to a vertical position. A second pair of hinge assemblies 36 and 37 are removably mounted in the top of table 11. For illustrative purposes, hinge assembly 34 is shown in detail in FIGURE 7 whereby an angle bracket 38 interconnects a pair of hinges 39, one being attached to top plane 29 and the other to side plane 28. The lower hinge assemblies 36 and 37 are similar except that only one hinge is required, the opposite end of the angle bracket being bent to fit in a groove in the table. Thus, the side planes 27 and 28 may be rotated about vertical axis defined by the hinge pins of assemblies 33 and 36, and 34 and 37, respectively, to a front position parallel to the front plane 22. Latch elements 41 are mounted on the edges of back wall 21 to lock the three planes in the closed position individually.

The geometric model 14 is provided with a universally adjustable mounting assembly 42, as best shown in FIGURE 6. One or more cavities 43, centrally located in table 11, provides for the insertion of support rod 44. An offset bracket element 46, having a bolt 47 affixed thereto for mounting the model, is pivotally fastened at 48 to the flattened top portion of rod 44. Thus, this assembly provides for angular adjustment of the model in both horizontal and vertical planes through rotation of the rod 44 or inclination of bracket 46. The model per se is preferably fabricated of clear acrylic plastic and constructed as desired to best illustrate the geometric problem under consideration, such as the intersection angles of a line and plane, true angle and line of intersection of two planes, or between a plane and a solid, etc. Specific points, lines, angles or area of the models may be marked with luminescent lacquer to be energized by exposure to ultraviolet light for easy identification.

The primary auxiliary plane assembly 16 comprises a pair of spaced vertical posts 51 mounted in holes in table 11. A horizontal cross rod 52 extends between a pair of socket fittings 53 clamped to posts 51 at the desired height. A small channel member 54 is affixed to cross rod 52 as by brazing to provide a bottom locator for plastic plate 56 utilized as a delineating plane. A second rod element 57 is fastened to cross rod 52 toward one of its extremities to serve as a spindle for wrap-around hinge elements 58 attached to one edge of plate 56. Thus, if plate 56 is urged upwardly a sufficient distance to be free of channel 54, it may be rotated about rod 57 to a position for easy viewing. A collar 59 is provided to limit the upward sliding movement of plate 56. It will be readily understood that the auxiliary plane assembly 16 may be mounted adjacent the left side plane if desired by inserting the posts in suitable holes provided therefor and that the plate member 56 is readily accessible for manipulation by removing front plate 22.

The second auxiliary plane assembly 18 is adjustably supported at the extremity of arcuate arm 17 extending under and around table element 11, the arcuate member 17 being free to swing through the slot 61 formed between the beveled under-surface of table 11 and the angled top portion of cylindrical wall 19. A clamp assembly 62 is provided on a vertical sleeve 63 co-axially installed on support post 13 between flanged member 64 affixed to base 12 and table 11. As best shown in FIGURES 4 and 5, clamp assembly 62 comprises a set of co-acting angular jaw elements 66 and 67 having their upper flanges juxtaposed to effect a hinge to permit gripping the lower portion of arcuate arm 17. A pair of cut-outs 68 are provided in the upper flange of angle 66 toward its ends to permit the guided passage of arm 17 and a thumb screw 69 provides for tightening angle 67 toward angle 66 to grip the horizontal flange of arcuate member 17. Angle member 66 is secured to sleeve 63 by brazing and a second thumb screw 71 is threadedly mounted in sleeve 63 to press against stationary post 13 to lock the sleeve and support assembly against rotation. It should be here noted that the clamp assembly 62, sleeve 63, as well as flanges 64 are hidden from view behind wall screen 19 but the clamping means is readily accessible through the opening at the back.

The upper extremity 72 of arcuate arm 17 is drilled to provide for the mounting of an adjustable support assembly 73 comprising a pair of back-to-back angle brackets 74 which permit positioning of auxiliary plane 18 at any desired attitude. An L-shaped frame member comprising a pair of rods 77 and 78 joined at right angles has a mounting tab 79 affixed to the middle of the lower rod 77 for fastening to support bracket 74. A small channel 81 affixed to rod 77 acts as a locator for a plastic plate 82 having a pair of hinges 83 mounted about rod 78. Thus, plate 82 may be rotated to a position parallel to front plane 22 when lifted clear of channel 81.

*Use of Projection Apparatus for Demonstration*

One example of a demonstration of the invention for instructional purposes will be set forth herewith in an explanation of the general procedure to be followed. The problem chosen for illustrative purposes is determining the angle of intersection between two planes, or demonstrating how the true angle of intersection between two planes is established by descriptive geometry. The primary auxiliary plane assembly 16 and secondary auxiliary plane assembly 18 are set up in positions approximately as shown in FIGURE 1 and the geometric model 14 on its support rod 44 is inserted into position in the mating hole in table 11. The model 42, consisting of an intersecting triangle and parallelogram is adjusted so the base is parallel to the table 11 and the lower edge of the triangular plane is parallel to the front plane 22. The ultraviolet light is turned on to activate the luminescent markings on the model. The outlines of the geometric figure may then be projected to the front and top planes and to be delineated with a marking pencil as indicated at "A" and "B" on FIGURE 1, thus affording a top plan view and a front elevational view. If desired, additional views of the model may also be projected to the left and right side plane 27 and 28. The planes may then be rotated about their hinge axis to a position parallel to front plane 22 thus simulating generally a two-dimensional drawing. The front plane 22 is then removed for access to the auxiliary plane assembly 16, which is adjusted so that plastic plate 56 is parallel to the line of intersection of the triangle and parallelogram of model 14. Side plane 28 is swung open and a projection of the model is marked on plate 56 as indicated at "C." It will be noted that the true length of the line of intersection is found in this view. Auxiliary plane assembly 18 is now adjusted so the plane of plate 82 is perpendicular to the line of intersection; that is, the projection of the line of intersection to plate 82 is reduced to a point. A projection of the model will provide a graphic illustration of the true angle of intersection between the two planes of the model. Upon completion of the graphic projection on the auxiliary planes, they may be moved to a viewing position, parallel to the front plane of the projection box in the manner previously explained.

It will be understood that this projection apparatus is useful both in illustrating and solving many different descriptive geometry problems, only one of which has been set forth herein, the basic requirement being that the model used clearly depicts the relevant problem under consideration.

I claim:

1. In a geometric projection apparatus, a cubical box structure comprising a horizontal base plate having an upstanding back plate rigidly attached thereto, a transparent top plate and two transparent side plates connected thereto by angular hinge members, said side plates being supported at their forward lower edge by hinges removably affixed to said base plate, a transparent front plate removably mounted in a transverse groove in said base plate, a geometric model adjustably mounted within said box structure, a first auxiliary plate assembly adjustably mounted adjacent to said box structure and a second auxiliary plate assembly adjustably supported on a mobile arcuate member extending under and around said base plate.

2. In a geometric projection apparatus, a cubical box structure comprising a horizontal base having an upstanding back wall rigidly attached thereto, a transparent top plate hingedly interconnected to two transparent side plates pivotally supported on said base, a transparent front plate removably mounted in a groove in said base, an adjustably geometric model and auxiliary plate mounted within said box, and a second auxiliary plate adjustably supported on a mobile arcuate member extending under said base, said top, side and auxiliary plates being hingedly mounted to permit their rotation to a position parallel to said front plate.

3. The device of claim 1 wherein the mobile arcuate member is mounted on a rotatable support centrally located beneath said base plate.

4. The device of claim 2 wherein said model has portions thereof treated for activation by an ultraviolet light source.

References Cited in the file of this patent

UNITED STATES PATENTS

| | | |
|---|---|---|
| 2,319,162 | Short | May 11, 1943 |
| 2,335,941 | Howard | Dec. 7, 1943 |
| 2,718,072 | Douglas | Sept. 20, 1955 |

FOREIGN PATENTS

| | | |
|---|---|---|
| 673,326 | Great Britain | June 4, 1952 |